Sept. 13, 1960 J. H. KOCH 2,952,079
TRAINING PANEL ASSEMBLY
Filed Aug. 21, 1957 2 Sheets-Sheet 1
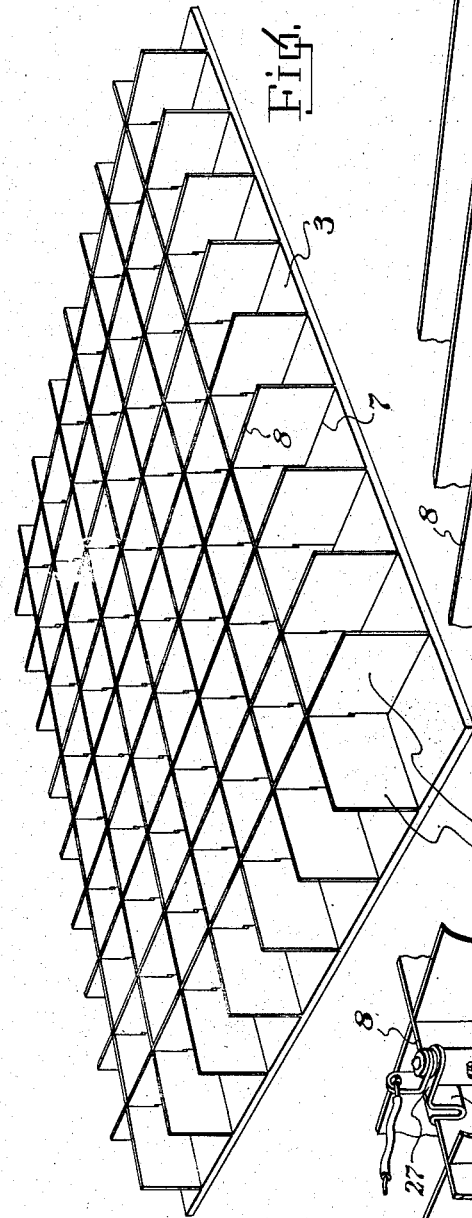
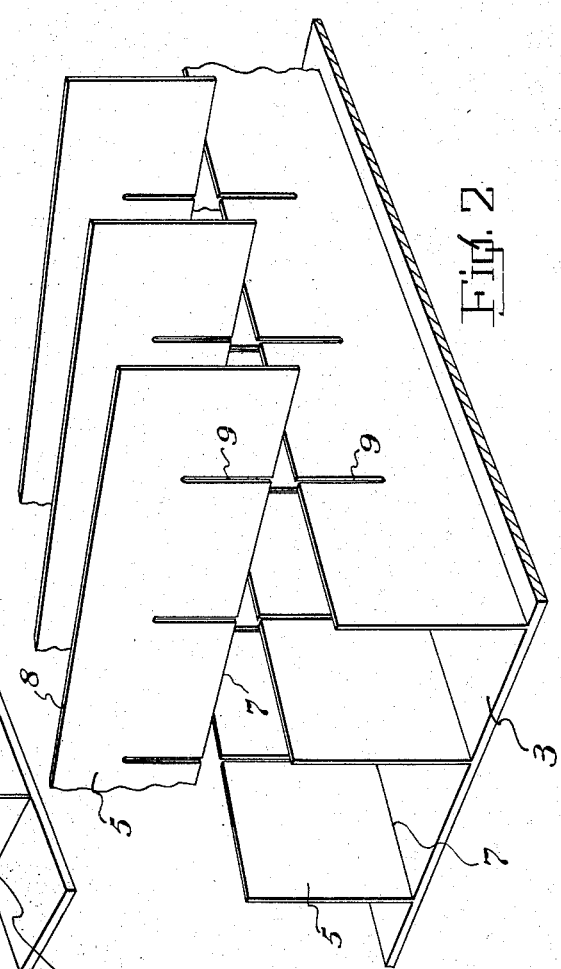
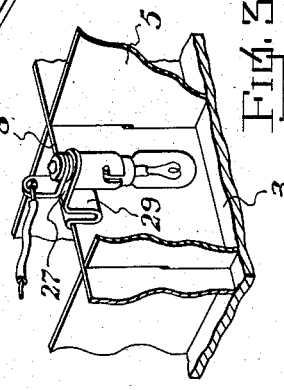
John H. Koch
INVENTOR.
BY Robert J Patry
ATTY Sept. 13, 1960 J. H. KOCH 2,952,079
TRAINING PANEL ASSEMBLY
Filed Aug. 21, 1957 2 Sheets-Sheet 2

John H. Koch
INVENTOR.

BY *Robert J. Patin*
ATTY

United States Patent Office 2,952,079
Patented Sept. 13, 1960

2,952,079

TRAINING PANEL ASSEMBLY

John H. Koch, Tulsa, Okla., assignor to Burton-Rodgers, Inc., Tulsa, Okla., a corporation of Oklahoma Filed Aug. 21, 1957, Ser. No. 679,510

7 Claims. (Cl. 35—1)

The present invention relates to training panel assemblies and/or visual monitoring assemblies and the like, and more particularly to training panel assemblies for instruction or visual monitoring purposes in which a plurality of light sources such as electric lights indicate fluid flow systems, gas, electric circuitry, or traffic control or the like.

Training panel assemblies are known to the prior art. In these prior art assemblies, a schematic diagram of the visible face of the trainer is first drawn up, and then sheet metal baffles are formed to fit the contours of the lines of the diagram. The baffles are then mounted on a supporting sheet and light bulbs are installed on a sheet metal supporting sheet, the baffles then being formed and placed around the light bulbs. A plastic material is installed over the top of baffles, so that various switch-controlled light compartments are provided. These compartments are not accessible other than by removing the plastic face of the trainer or the back of the trainer; and it is very difficult to change any of the hundreds of light bulbs used and to perform normal maintenance adjacent to the bulbs. Naturally, a training assembly of this type is quite costly and must be custom made for each particular lesson of instruction. An assembly of this type cannot be altered in any material respect for the purpose of giving a different indication without extensive rebuilding; and for this purpose, the training panel assembly must be returned to the manufacturer.

Thus, although training panel assemblies as known heretofore are definitely useful and have important commercial, educational and public applications, they are, nevertheless, expensive and inflexible.

Accordingly, it is an object of the present invention to provide training panel assemblies, or visual monitoring assemblies, on which any of a variety of illuminated linear indicia, or other indicia, may be arranged at will.

Another object of the invention is to provide training panel assemblies, or visual monitoring assemblies, having illuminated linear indicia, or other indicia, which may be rapidly altered even to an entirely different form.

A further object of the present invention is to provide training panel assemblies, or visual monitoring assemblies, having illuminated indicia provided by a multiplicity of light sources and in which any single source of light may be quickly replaced.

Still another object of the present invention is the provision of training panel assemblies, or visual monitoring assemblies, having illuminated indicia provided by a multiplicity of light sources, in which repairs or modifications may be effected without disassembly.

Finally, it is an object of the present invention to provide training assemblies, or visual monitoring assemblies which will be quite simple and inexpensive to manufacture, easy to assemble, reassemble, maintain, repair, modify, and be rugged and durable in use.

Other objects and advantages of the present invention will become apparent from a consideration of the following description, taken in conjunction with the accompanying drawings, in which:

Figure 1 is an isometric view of the rear of a training panel assembly, or visual monitoring assembly, according to the present invention, prior to the installation of lights thereon;

Figure 2 is a fragmentary view similar to Figure 1 but showing a stage in the construction of a training panel assembly, or visual monitoring assembly, according to the present invention;

Figure 3 is a fragmentary view similar to Figure 1 but showing the attachment of an individual light;

Figure 4:
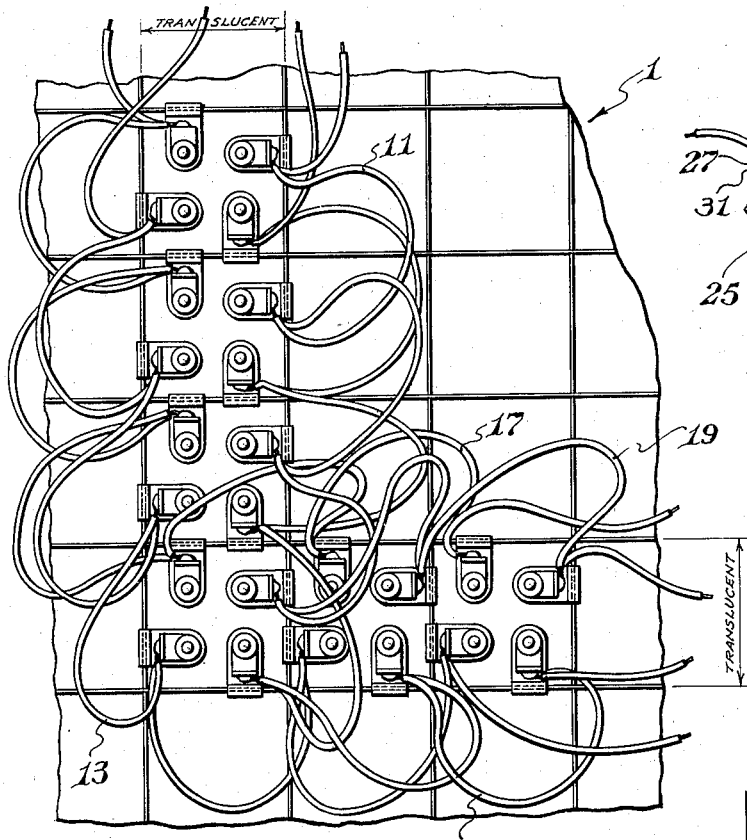
Figure 4 is a fragmentary elevational view looking toward the rear of a completely assembled training panel assembly, or visual monitoring assembly, according to the present invention.
Figure 5:
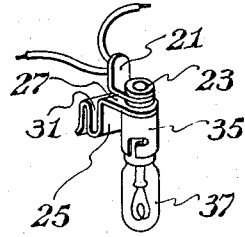
Figure 5 is an isometric view of a light forming a portion of the assembly.
Figure 6:
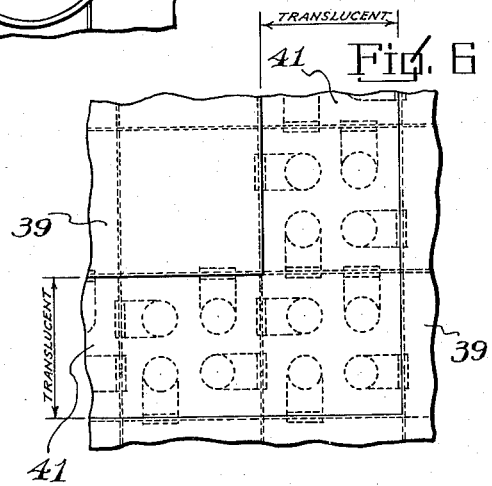
Figure 6 is a fragmentary view similar to Figure 4 but looking toward the front of the panel assembly.
Figure 7:
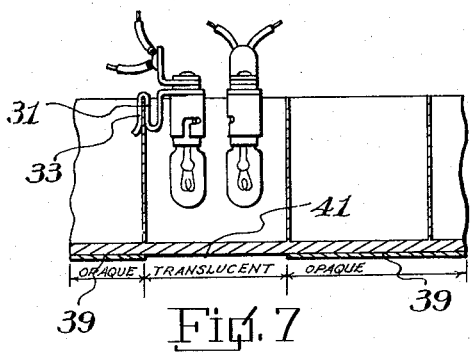
Figure 7 is a fragmentary cross-sectional view through a training panel assembly in accordance with the present invention.

Referring now to the drawings in greater detail, there is shown a training panel assembly, or visual monitoring assembly, indicated generally at 1 and comprising a uniplanar translucent panel 3, which may be of frosted glass or frosted plastic or other light penetrable material. Secured to the rear face of panel 3 is a plurality of intersecting flat strips 5 having straight parallel side edges 7 and 8.

Each strip 5 along edge 7 thereof is secured to the rear face of panel 3 as by cementing, in which instance panel 3 may comprise an ordinarily transparent panel rendered translucent by frosting. Strips 5 are each disposed to a plane perpendicular or approximately so to the plane of panel 3 and each strip 5 intersects a plurality of other strips 5. To this end, the strips 5 extending in one direction are provided with slots 9 extending inwardly from edges 7 a distance slightly more than half the width of the strip, while the strips 5 extending in the other direction are provided with slots 9 extending inwardly from edges 8 a distance slightly more than half the width of the strip, so that the strips may be assembled in interdigitating relationship, as seen by comparison of Figs. 2 and 1. There is thereby formed a plurality of compartments defined at their forward side by a portion of panel 3 and on four lateral sides by portions of strips 5, each compartment being open at the rear. Naturally, compartments of different shapes may be achieved by the disposition of strips 5 so as to form triangular or hexagonal compartments. In any case, edges 8 in the assembled structure are substantially uniplanar and form in effect an exposed grid disposed rearwardly of panel 3.

Detachably secured to the grid thus provided is a plurality of strings of lights 11, 13, 15 and 17 comprised of a plurality of short electrically conductive wires 19 which connect in series a plurality of connectors 21 each of which is held in unitary assembly by a headed fastener 23 with a bracket 25. Fastener 23 passes through connector 21 and bracket 25.

Each bracket 25 has a horizontal portion 27 through which fastener 23 passes and which terminates laterally outwardly in a downwardly extending portion 29 which in turn terminates in an upwardly extending finger 31 having at its upper end an opposed, downwardly extending finger 33, the fingers 31 and 33 being normally spaced apart less than the width of a strip 5 so as to provide a resilient clip engageable over any edge 8 of a strip 5 for selectively detachably holding the lights in any of a plurality of positions of adjustment relative to the remainder of the training panel assembly. It should be noted that the bend between fingers 31 and 33 is substantially coplanar with horizontal portion 27 and that the clip provided by fingers 31 and 33 is longitudinally coextensive with a socket 35 to which horizontal portion 27 is secured by headed fastener 23 passing therethrough. A light bulb 37 is detachably secured in each socket 35 by a quick detachable connection.

Thus, the lights may be quickly clipped on to the rear of the training panel assembly, in which position bulbs 37 will extend forwardly into the compartments, the light supplied by the bulb or bulbs in a given compartment being confined to that compartment by opaque strips 5 which may be of sheet metal, plastic, or the like, so that only that portion of light penetrable panel 3 bounded by the portions of strips 5 defining the compartment in which the light is located will be illuminated by a given light.

Opaque dams are provided in the form of opaque coverings 39 for masking those portions of panel 3 defined by compartments having no lights therein, for the dual purpose of preventing the passage of stray light from the rear through portions of the panel which should not be illuminated and of providing a background against which instructional representations of equipment used in animated flow or circuit diagrams other than the illuminated lines, such as switches, pumps, and so on may be shown. Opaque coverings 39 may be in the form of panels of pressure sensitive adhesive material which may be quickly applied and peeled off when and where desired, or they may be in the form of areas of paint can be quickly applied and removed by scraping. Opaque coverings 39 are discontinuous to leave therebetween translucent stripes 41 whose position on panel 3 corresponds to the location of the compartments in which the electric lights are to be disposed.

In use, the strings of lights may be applied to the panel assembly simply by clipping on the brackets 25 where desired. The configuration of brackets 25 is such that they cannot be applied to the panel in any way other than to position bulbs 37 in the desired location within the compartments. A large element of flexibility is afforded by the use of strings of lights of different colors; for example, string 11 may consist of red lights, string 13 yellow lights, string 15 green lights and string 17 blue lights, so that a plurality of intersecting or coextensive and distinctively different lines may be indicated, the lines appearing for instructional purposes or display when viewed from the front of the panel as illuminated lines of different colors, the lines being sharply delineated by the extent of translucent stripes 41.

Wires 19 are of a length greater than the width of the compartments, that is to say, greater than the distance between adjacent parallel strips 5, so that an individual light may be unclipped for repair or replacement of the bulb without disturbing any of its neighbors. Similarly, minor readjustments of the strings of lights may be made simply by unclipping a few lights anywhere in a string without removing the entire string. In any event, the removal and repositioning of an entire string may in the same manner be quickly effected. Either before or after the positioning of the lights, opaque coverings 39 may be applied and the representations of unilluminated equipment made thereon.

Accordingly, it will be apparent that an instructor working beside the panel can, during the course of a lesson, display a great number and variety of linear representations of considerable complexity, changing them at will as the lesson proceeds. Hence, it will be obvious that a training panel assembly of great versatility and flexibility has been provided, and that all of the initially recited objects of the present invention have been achieved.

Although the present invention has been described in connection with preferred embodiments, it is to be understood that modifications and variations may be resorted to without departing from the spirit of the invention, as those skilled in this art will readily understand. Such modifications and variations are considered to be within the purview of the present invention and the scope of the appended claims.

What is claimed is:

1. A display device comprising a light-penetrable panel, means defining a plurality of compartments on one side of said panel, said compartments extending plural compartment-widths in two dimensions measured in the plane of said panel, each of said compartments being closed on one end by said panel and open on its opposite end, the portions of the walls of said compartments remote from said panel presenting a network of exposed wall edge portions, at least one string of lights, and means individual to each of the plurality of said lights detachably securing said lights to respective of said exposed wall edge portions, each of said plurality of lights extending into a respective one of said compartments.

2. A display device according to claim 1 having an opaque material covering portions of said panel which close certain of said compartments.

3. Apparatus according to claim 1 in which said means for detachably securing said lights to said edge portions comprises a plurality of clips secured to said lights, each of said clips detachably engaging over a respective one of said thin wall edge portions, each of said plurality of lights extending into one of said compartments.

4. Apparatus according to claim 1 in which said means defining a plurality of compartments comprises a plurality of strips secured contiguous to one face of the panel, each of said strips intersecting a plurality of others of said strips to define said plurality of compartments.

5. A display device comprising a uniplanar light-penetrable panel, a plurality of thin uniplanar strips on one side of said panel, the plane of each of said thin strips being disposed at a substantial angle to the planes of a plurality of other of said strips, each of said strips having a thin edge which abuts said panel, each thin strip being disposed perpendicular to the plane of said panel, said thin strips defining a plurality of thin-walled compartments closed at one side by said panel and open at the sides away from said panel, said compartments extending plural compartment widths in two dimensions measured in the plane of said panel, the portions of said thin strips remote from said panel presenting a network of exposed edge portions, at least one string of lights, and means individual to each of a plurality of said lights for detachably securing respective of said lights to said edge portions, each of said lights extending into one of said compartments.

6. A display device comprising a light-penetrable panel, means defining a plurality of compartments on one side of said panel, said compartments extending plural compartment-widths in two dimensions measured in the plane of said panel, each of said compartments being closed at one end by said panel and open at an opposite end away from said panel, the portions of the walls of said compartments remote from said panel presenting a network of exposed edge portions, at least one string of lights, said string comprising a plurality of light bulb bases, a light bulb detachably secured to each of said bases, flexible conductors interconnecting said bases, and means individual to each of said bases for detachably securing respective of said bases to said edge portions, each of said bulbs extending into one of said compartments.

7. An animated display device for use in training one or more trainees in the operation of a machine, comprising in combination, a translucent sheet panel observable by one or more trainees, said panel being provided with various translucent areas corresponding to various portions of said machine and with adjacent opaque background areas, an interdigitating network of thin strips mounted on their edges on the rear side of said panel to provide a plurality of compartments each closed on one end by said translucent panel and open at the other end, said thin strips including a first group of mutually parallel strips extending in a first direction and a second group of mutually parallel strips extending in a second direction perpendicular to said first direction, each of said strips having a plurality of transverse slits partially across their widths, with transverse slits of said first group engaged to mesh with transverse slits of said second group to provide said interdigitating network, said compartments extending plural compartment widths in said two directions, and a plurality of electric lights individually mounted to extend into respective of said compartments to illuminate indicia on said panel.

References Cited in the file of this patent

UNITED STATES PATENTS

| | | |
|---|---|---|
| 1,300,893 | Stover | Apr. 15, 1919 |
| 1,337,872 | Zahnow | Apr. 20, 1920 |
| 1,761,239 | Scott | June 3, 1930 |
| 2,175,844 | Laystrom | Oct. 10, 1939 |
| 2,665,784 | Lacy | Jan. 12, 1954 |
| 2,817,915 | Chatkin | Dec. 31, 1957 |